(12) United States Patent
Dubey et al.

(10) Patent No.: US 6,298,365 B1
(45) Date of Patent: Oct. 2, 2001

(54) METHOD AND SYSTEM FOR BOUNDS COMPARATOR

(75) Inventors: Pradeep Kumar Dubey, New Delhi (IN); Brett Olsson, Cary, NC (US); Ronald Ray Hochsprung, Los Gatos, CA (US); Hunter Ledbetter Scales, III, Austin, TX (US); Keith Everett Diefendorff, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,375

(22) Filed: Feb. 24, 1999

(51) Int. Cl.$^7$ ........................................ G06F 7/38
(52) U.S. Cl. ........................... 708/495; 340/146.2
(58) Field of Search .................... 708/495–514; 340/146.2

(56) References Cited

U.S. PATENT DOCUMENTS

| | | | |
|---|---|---|---|
| 3,825,895 | * 7/1974 | Larsen et al. | 340/146.2 |
| 4,857,882 | * 8/1989 | Wagner et al. | 340/146.2 |
| 5,357,237 | * 10/1994 | Bearden et al. | 340/146.2 |
| 5,630,160 | * 5/1997 | Simpson et al. | 708/490 |
| 6,205,460 | * 3/2001 | Steele, Jr. | 708/495 |

* cited by examiner

*Primary Examiner*—Tan V. Mai
(74) *Attorney, Agent, or Firm*—Casimer K. Salys; Bracewell & Patterson, L.L.P.

(57) ABSTRACT

The invention relates to a method of using a "bounds" comparator scheme and to a "bounds" comparator circuit. The method of using this scheme or comparator circuit allows a quick and easy test to characterize, utilizing a single floating-point bounds comparison function, the location of a point with respect to pre-defined end-points. The single floating-point bounds comparison function represents an additional instruction to be incorporated within computer instruction set architectures when performing trivial acceptance testing during the generation of three-dimensional images or graphics.

20 Claims, 7 Drawing Sheets

| | | Inputs | | | | | | | | | Result | |
|---|---|---|---|---|---|---|---|---|---|---|---|---|
| | | | | | | | α | | X | | | |
| $\alpha_{sign}$ | $\alpha_{exp} > X_{exp}$ | $\alpha_{exp} < X_{exp}$ | $\alpha_{exp} = X_{exp}$ | $\alpha_{frac} > X_{frac}$ | $\alpha_{frac} < X_{frac}$ | $\alpha_{frac} = X_{frac}$ | ∞ ($\alpha_{exp}$ = all 1s, $\alpha_{frac}$ = all 0s) | NaN ($\alpha_{exp}$ = all 1s, $\alpha_{frac}$ ≠ all 0s) | ∞ ($X_{exp}$ = all 1s, $X_{frac}$ = all 0s) | NaN ($X_{exp}$ = all 1s, $X_{frac}$ ≠ all 0s) | $cc_0$ | $cc_1$ |
| 0(+) | Yes | No | No | | | | No | No | No | No | 0 | 1 |
| 0(+) | No | Yes | No | | | | No | No | No | No | 0 | 0 |
| 0(+) | No | No | Yes | Yes | No | No | No | No | No | No | 0 | 1 |
| 0(+) | No | No | Yes | No | Yes | No | No | No | No | No | 0 | 0 |
| 0(+) | No | No | Yes | No | No | Yes | No | No | No | No | 0 | 0 |
| 1(-) | Yes | No | No | | | | No | No | No | No | 1 | 0 |
| 1(-) | No | Yes | No | | | | No | No | No | No | 0 | 0 |
| 1(-) | No | No | Yes | Yes | No | No | No | No | No | No | 1 | 0 |
| 1(-) | No | No | Yes | No | Yes | No | No | No | No | No | 0 | 0 |
| 1(-) | No | No | Yes | No | No | Yes | No | No | No | No | 0 | 0 |
| 0(+) | | | | | | | Yes | No | No | No | 1 | 0 |
| 1(-) | | | | | | | Yes | No | No | No | 0 | 0 |
| | | | | | | | No | Yes | No | No | 0 | 1 |
| | | | | | | | No | No | Yes | No | 1 | 1 |
| | | | | | | | Yes | Yes | Yes | Yes | 1 | 1 |

Inputs — 150; Result — 152

Fig. 7

METHOD AND SYSTEM FOR BOUNDS COMPARATOR

BACKGROUND OF THE INVENTION

1. Technical Field

The present invention relates to a method and system for data processing or information handling systems in general and, in particular, to a method and system for processing vector data in a computer system. Still more particularly, the present invention relates to a method and system for using a single "bounds compare" function when performing trivial acceptance testing in three-dimensional graphic operations.

2. Description of the Prior Art

Applications of modern computer systems are requiring greater speed and data handling capabilities for uses such as multimedia and scientific modeling. For example, multimedia systems generally are designed to perform video and audio data compression, decompression, and high-performance manipulation such as three-dimensional imaging and graphics. Three-dimensional imaging and graphics require massive data manipulation and an extraordinary amount of high-performance arithmetic and vector-matrix operations. Trivial acceptance testing and clipping are two problems in producing three-dimensional graphics which are bound by a series of floating-point comparisons and their respective conditional branches. The main problem is that traditional computer instruction set architectures do not provide the optimal set of primitives to implement the required function, namely a bounds comparison to determine if the condition, $-X \leq \alpha \leq +X$, is met, and if not, how it is not met. A typical application takes approximately seven computer instructions, including two compares and two dependent conditional branches to implement this function. Therefore, there is a need for accomplishing this result with a single "bounds compare" instruction that is less complex than using single compare instructions. The subject invention herein solves this problem in a new and unique manner that has not been part of the art previously.

SUMMARY OF THE INVENTION

In view of the foregoing, it is therefore an object of the present invention to provide an improved method and system for faster "bounds" comparison vector operations in a computer system or information handling system.

It is another object of the present invention to provide an improved method and system for performing trivial acceptance testing when generating three- dimensional images and graphics in a computer system or information handling system.

The invention relates to a method of using a "bounds" comparator scheme and to a "bounds" comparator circuit. The method of using this scheme or comparator circuit allows a quick and easy test to characterize, utilizing a single floating-point bounds comparison function, the location of a point with respect to pre- defined end-points. The single floating-point bounds comparison function represents an additional instruction to be incorporated within computer instruction set architectures when performing trivial acceptance testing during the generation of three-dimensional images or graphics.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 6 is a table illustrating the results obtained by using the gate level logic shown in FIG. 5.

DETAILED DESCRIPTION OF A PREFERRED EMBODIMENT

Figure 1:
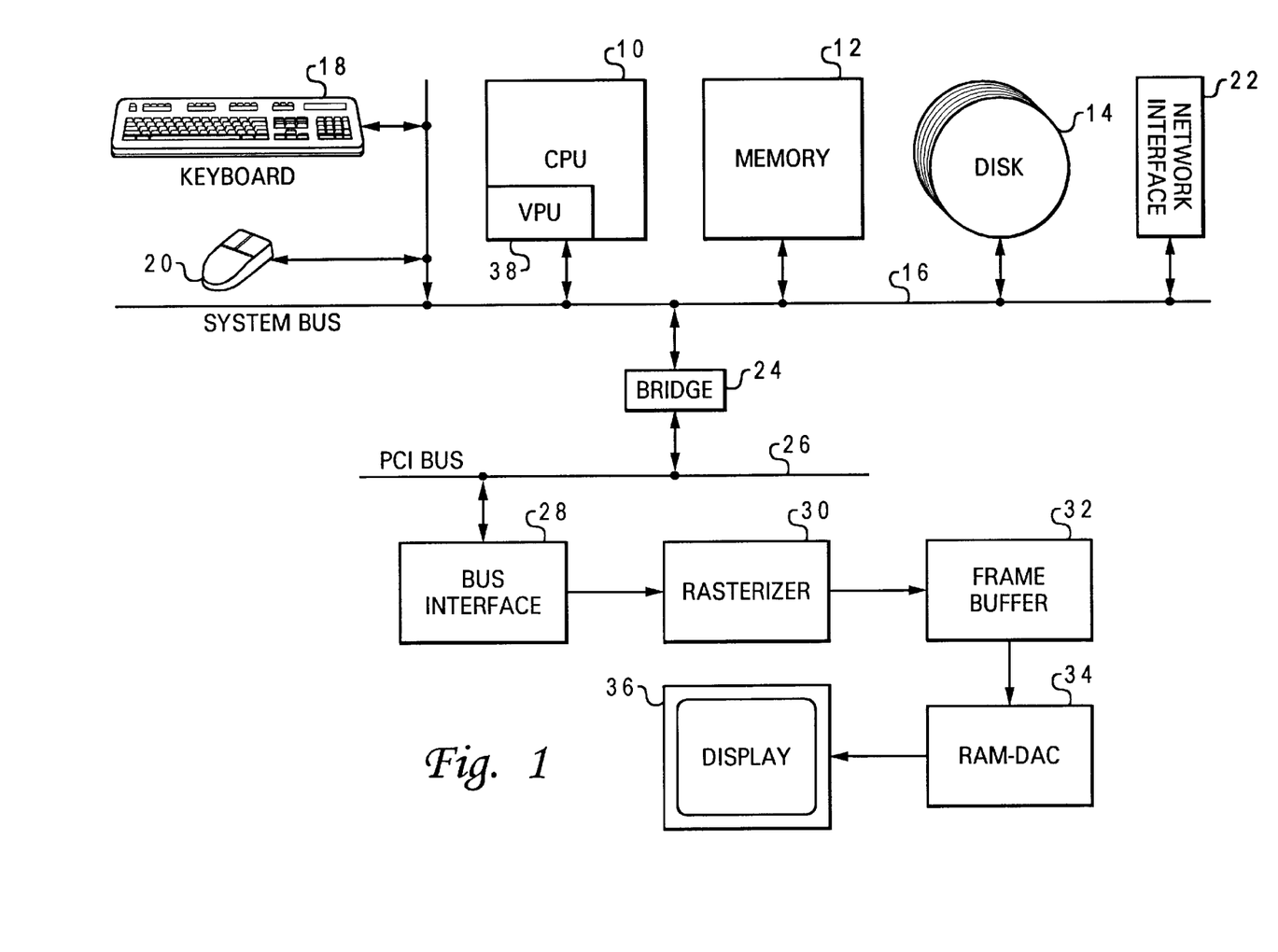
FIG. 1 is a system block diagram of a computer system, which may be utilized in conjunction with a preferred embodiment of the present invention.

The present invention may be executed in a variety of computer systems under a number of different operating systems or information handling systems. Referring now to the drawings and in particular to FIG. 1, there is depicted a system block diagram of a computer system which has a graphics display output that may utilize the bounds comparator feature of the invention. The computer system includes a CPU 10, main (physical) memory 12, and disk storage 14, interconnected by a system bus 16. Other peripherals such as a keyboard 18, mouse 20, and adapter card 22 for interface to a network are included in the computer system. The graphics subsystem is connected to the CPU and memory via a bridge 24 and PCI bus 26. This is just an example of one embodiment of a computer system and bus arrangement; features of the invention may be used in various system configurations.

The graphics subsystem includes a bus interface chip 28 connected to the PCI bus 26 to handle transfer of commands and data from the CPU and memory to the graphics subsystem. A rasterizer 30 generates pixel data for a bit-mapped image of the screen to be displayed, for storing in a frame buffer 32. The data stored in the frame buffer is read out via a RAMDAC or RAM and digital-to-analog converter 34 to a CRT display 36, for each screen update. Referring once again to FIG. 1, formed within the integrated circuitry of the CPU 10 is an execution unit for vector processing shown as VPU 38. VPU 38 performs vector-oriented operations for performing three-dimensional graphics using operands received from vector processing registers not shown. In accordance with one preferred embodiment of the present invention, formed within the integrated circuitry of the VPU 38 is a bounds comparator circuit which will be fully explained below.

Figure 2:
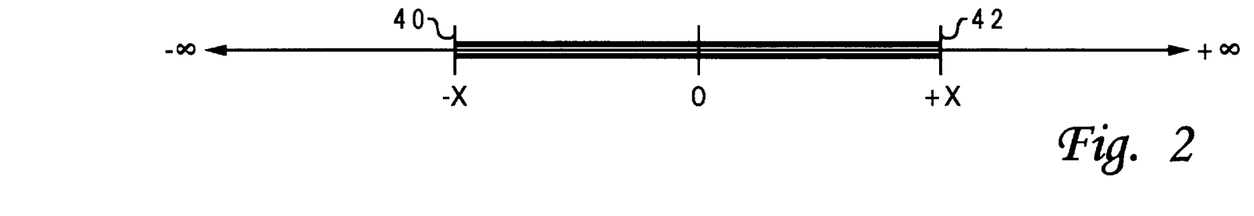
FIG. 2 is a number line depicting bound conditions in accordance with the teachings of this invention.

Referring now to FIG. 2, there is shown a number line depicting bounds conditions for use by the present invention. "In-bounds" is defined to be any point, a, which resides within the shaded area of the number line, between $-X$ and $+X$, 40 and 42 respectively. "Out-of-bounds" is defined to be any point that resides outside the shaded area of the number line. It is important to identify, for a point that is "Out-of-bounds", how it is "Out-of-bounds", whether it is too small (less than −X) or too large (greater than +X). For compliance to the IEEE (Institute of Electronic and Electrical Engineers) 754 floating-point standard, it is also important to uniquely characterize invalid points such as "Not-a-Numbers" (NaN), which are neither "In-bounds" nor "Out-of-bounds".

Figure 3:
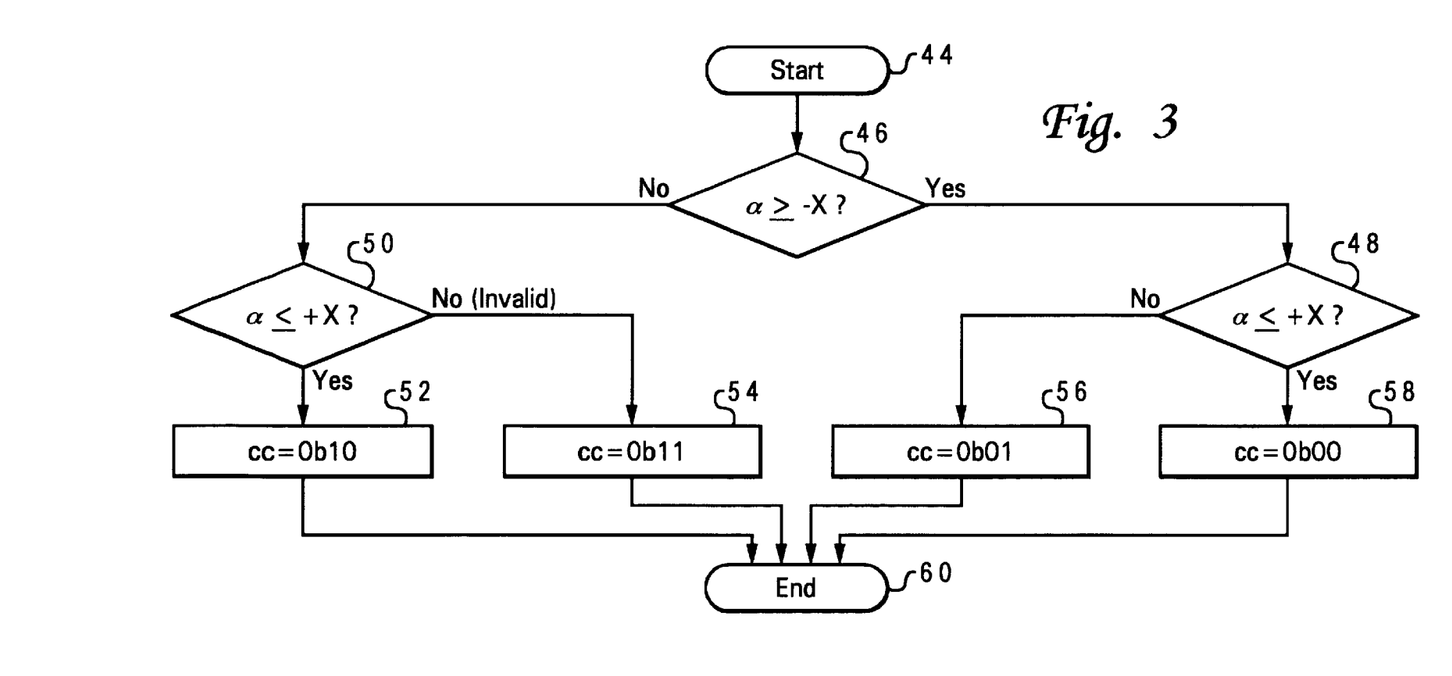
FIG. 3 is a logic flow diagram of a method for performing a bounds comparison along the number line shown in FIG. 2.

Referring now to FIG. 3, there is shown a high-level flow diagram illustrating the process of performing a bounds check to determine if a point, a, is "in-bounds" (−X≦α≦+X) or "Out-of-bounds" (a is less than −X or greater than +X or invalid (a is an IEEE "Not-A-Number" referred to as a NaN). As shown in FIG. 3, at the start 44 of the process, a is checked to see if it is greater than or equal to −X 40, as shown in step 46. If a is greater than or equal too −X, then the process moves to step 48 wherein a is checked to see if it is less than or equal too +X 42. Here, a 2-bit result is produced as a result of this side of the bounds check which characterizes a with respect to the defined bounds, ±X. If α is "in-bounds" a 2-bit result of 0b00 is returned, shown in step 58, and the process ends at step 60. If a is "out-of-bounds" and is greater than +X, then a 2-bit result of 0b01 is returned, shown in step 56, and the process ends at step 60. If α is not greater than or equal too −X, then the process moves to step 50 wherein a is once again checked to see if it is less than or equal too +X 42. Similarly as before a 2-bit result is produced as a result of this side of the bounds check which characterizes a with respect to the defined bounds, ±X. If a is "out-of-bounds" and is less than −X, 40 then a 2-bit result of 0b10 is returned, shown in step 52, and the process ends at step 60. If α is invalid (an IEEE "Not-A-Number"), then a 2-bit result of 0b11 is returned, shown in step 54, and the process ends at step 60.

The above-described process may be implemented using the PowerPC instruction set architecture used in association with the PowerPC™ family of processors available from International Business Machines of Armonk, N.Y. The process may be optimally implemented in software using two floating-point compares, 2 conditional branches, 2 condition register logical instructions and 1 load immediate and 2 OR immediate instructions. The PowerPC code to implement the bounds comparison process is as follows:

| start: | fcmpo | cr0,f00,f01 | # compare α to −X |
|---|---|---|---|
|  | fcmpo | cr1,f00,f02 | # compare α to +X |
|  | cror | cr0.0,cr0.FL,cr0.FU | # α < −X or α is a NaN |
|  | cror | cr1.0,cr1.FC,cr1.FU | # α > +X or α is a NaN |
|  | li | r00,0b00 | # initialize result to assume "in-bounds" |
|  | bf | cr0.0,next | # don't set bit 0 of result if not (α < −X or α is a NaN) |
|  | ori | cc,0b10 | # set bit 0 or result |
| next: | bf | cr1.0,end | # don't set bit 1 of result if not (α > +X or α is a NaN) |
|  | ori | cc,0b01 | # set bit 1 of result |
| end: | ... |  |  |

As shown above, a typical application takes approximately seven computer instructions, including two compares and two dependent conditional branches to implement. The subject invention herein comprises, in one embodiment, a circuit for accomplishing this result with a single "bounds compare" instruction that is less complex than using single compare instructions. The circuit reduces this work to a single bounds comparator function which may be manifested as a single floating-point compare bounds instruction to be executed in the floating-point execution unit 38 of a computer processor such as the PowerPC 750 owned by the IBM Corporation.

Figure 4A:
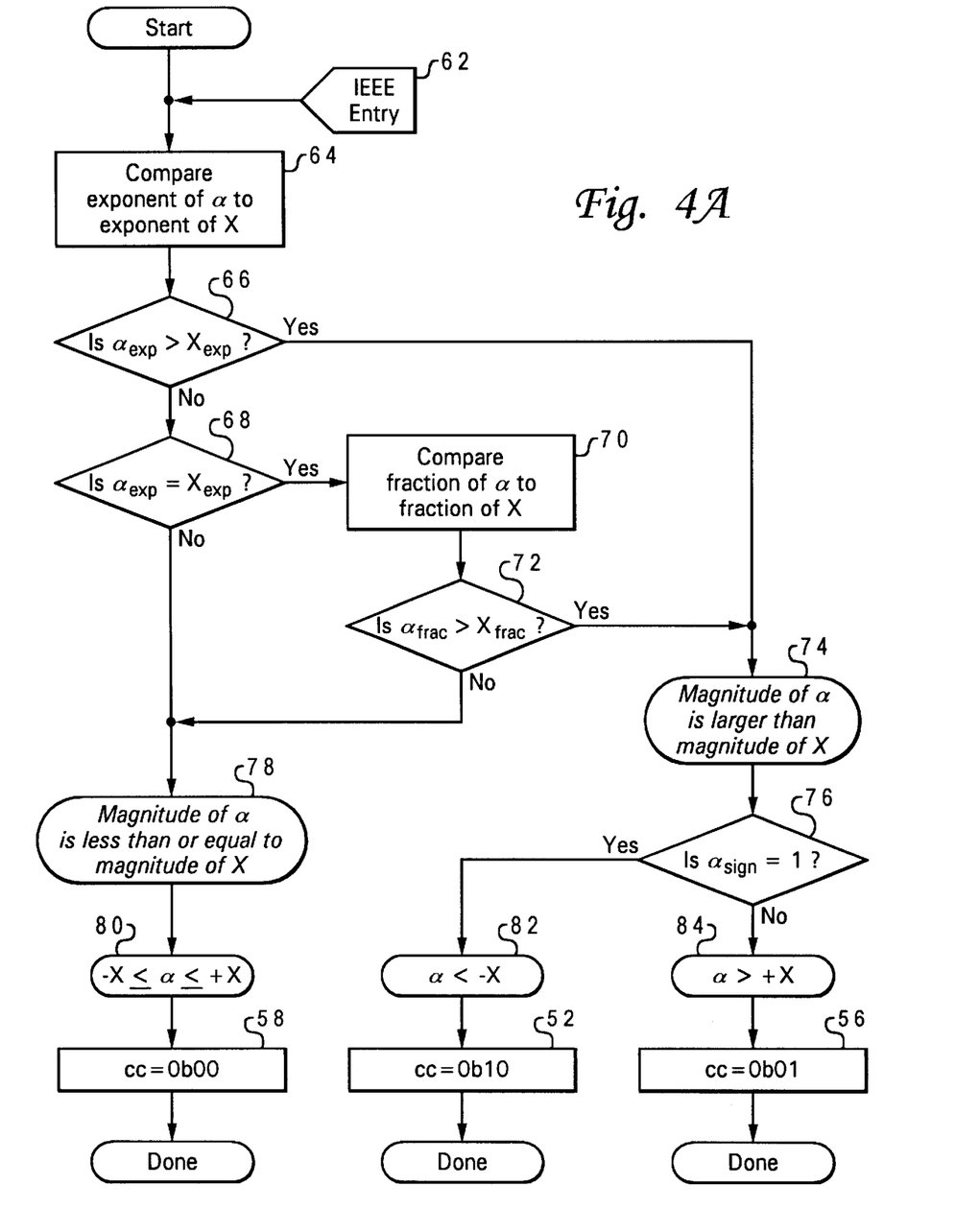
FIG. 4A is a high-level logic flow diagram representing a single bounds comparator function in accordance with the present invention.
Figure 4B:
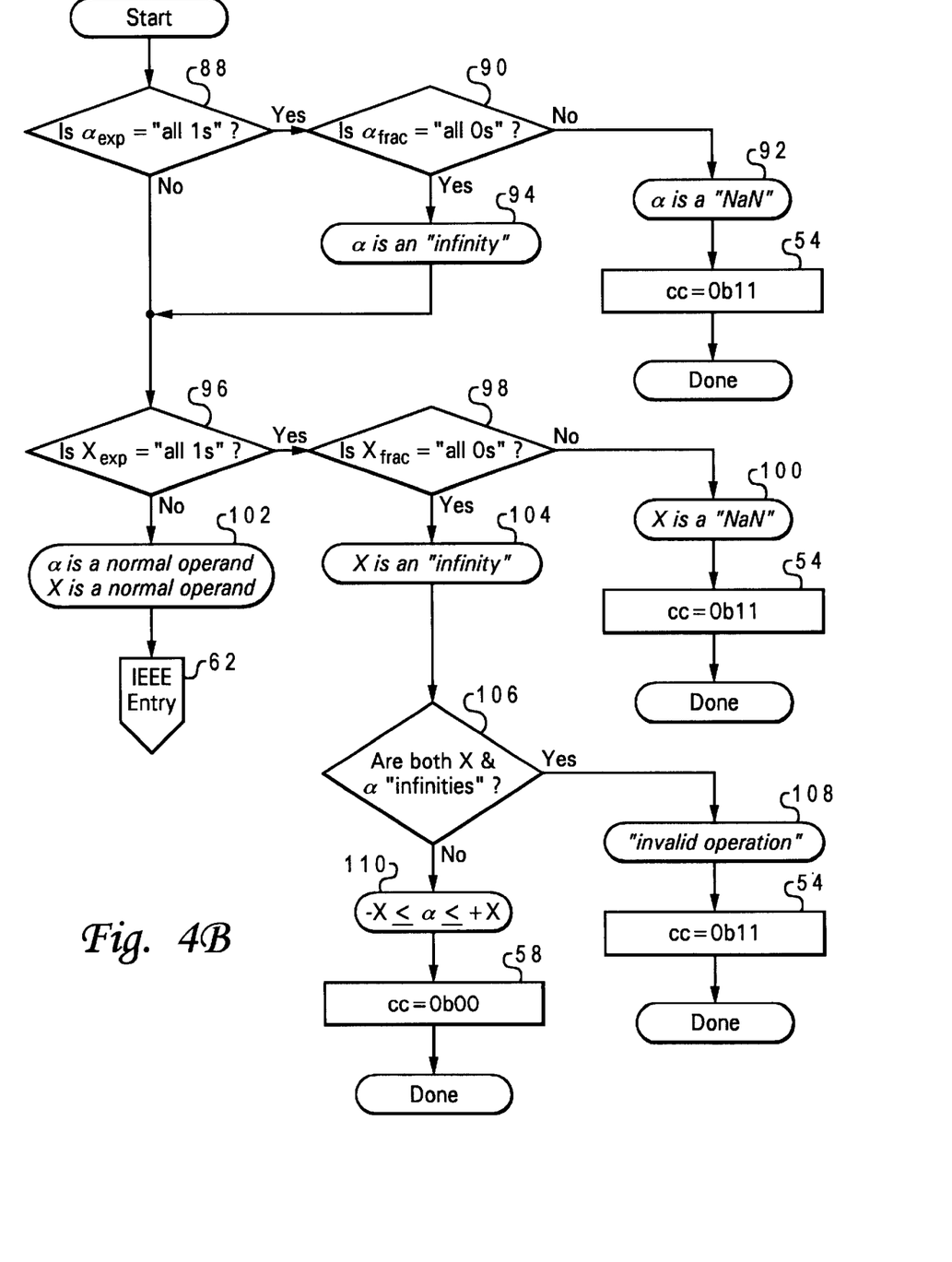
FIG. 4B is an extension of the high-level logic flow diagram depicted in FIG. 4A.

In accordance with the present invention, several components of a classical floating-point comparison function are employed, namely the comparators for the exponent and fraction fields of the floating-point values, α and X, which compute whether the exponent/fraction field of α is greater than, less than or equal to the exponent/fraction field of X. The full, classic floating-point comparison function would manipulate the outputs of these comparators along with the sign bits of each floating-point operand to determine whether the floating-point value, α, is greater than, less than or equal to the floating-point value, X. The outputs of these comparators can be manipulated in a different fashion to compute a bounds comparison to determine whether α is less than −X, greater than +X, between −X and +X, inclusive, or is not a valid comparison. FIGS. 4A and 4B is a high-level logic flow diagram illustrating how these comparators are employed to implement the bounds comparator, producing the 2-bit result described in FIG. 3.

Figure 5:
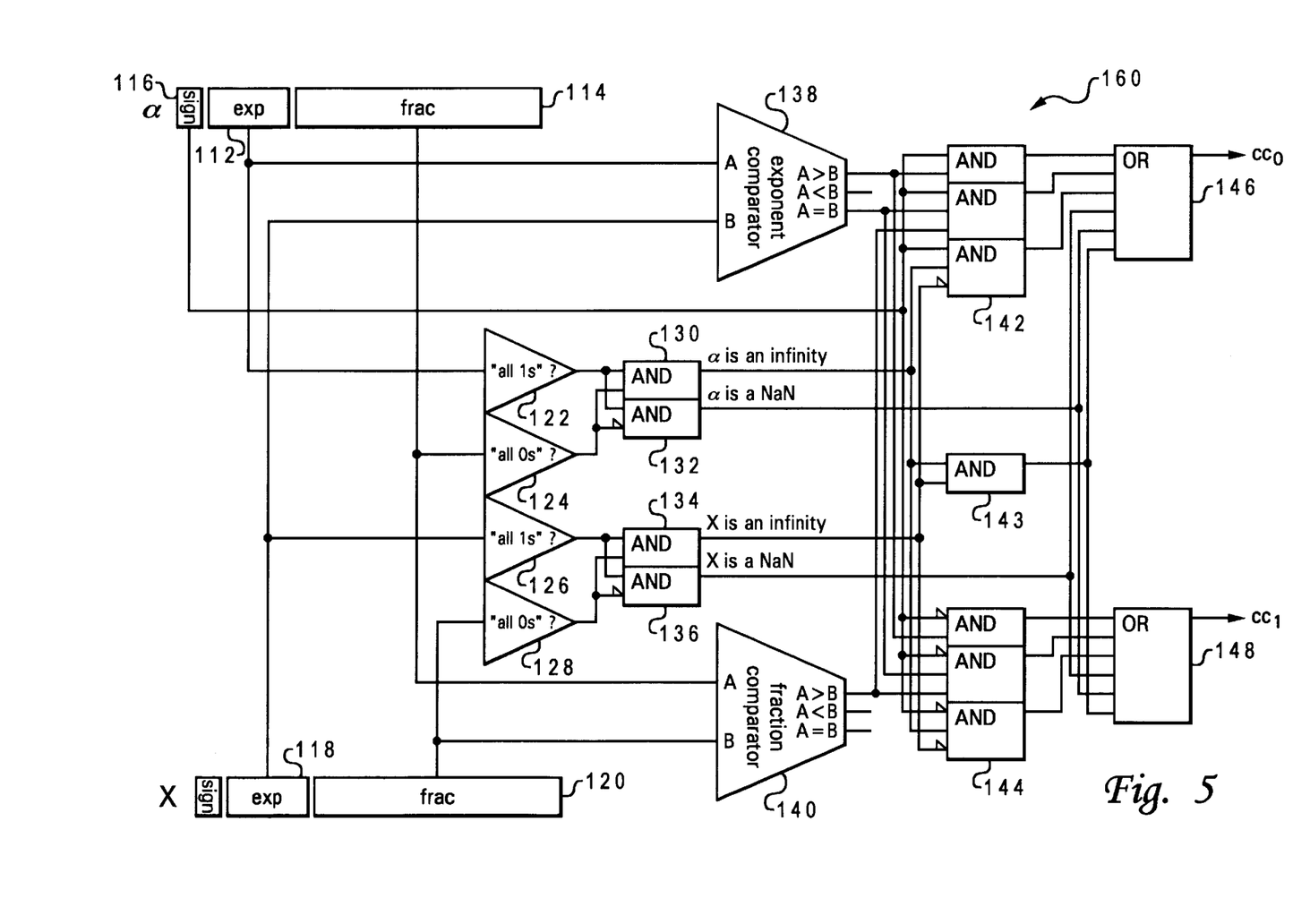
FIG. 5 is a gate level logic implementation of the bounds comparator function in accordance with a preferred embodiment of the present invention.

FIG. 5 illustrates a circuit 160 for one approach to a gate-level logic implementation of the bounds comparator function specified by the high-level logic flow diagrams shown in FIGS. 4A and 4B. The circuit 160 also provides support for special case operands (e.g. infinity and "Not-a-Number"), which are supported in the IEEE 754 standard, but such support is not necessarily critical to this function for some applications such as 3-D graphics. As shown in FIG. 5, the circuit 160 has two floating-point inputs, α and X, and produces a 2-bit output, $cc_0$ and $cc_1$. The floating-point values can be any arbitrary format (e.g. IEEE single, double, or extended formats, IBM hexadecimal formats, etc.)

In the preferred embodiment, the floating-point values must be sign-magnitude format, which means their significand (fraction) must be positive magnitude with a sign bit to determine if the floating-point value is positive or negative. The exponent can be 2's complement, or biased, however the exponent comparator used to compare exponent fields must produce results that accommodate their representation (i.e., positive exponents must compare greater than negative exponents).

The circuit 160 illustrated in FIG. 5 provides support 30 for IEEE special cases such as infinity and "Not-a-Number" and uses the IEEE-754 representation for these special cases (i.e. infinity has an exponent of all ones and a fraction of all zeros, "Not-a-Number" has an exponent of all ones and a fraction that is non-zero). However, other representations of special cases could be similarly supported, or no special cases may need to be supported.

Referring now to FIGS. 4A and 5, the first step 64 in the process is to compare the exponent 112 of α to the exponent 118 of X. By using the exponent comparator 138 in circuit 160, α is checked to see if it is greater than or equal to X, shown in steps 66 and 68. If α is greater than X the process moves to step 74 wherein having the magnitude of α being greater than the magnitude of X a determination of the sign of α is next checked in step 76. In circuit 160, the sign 116 is compared to the output of exponent comparator 138 through one of the "and" gates 142. If the sign is equal to a bit value of one, it is positive and α is greater than +X, shown in step 84 wherein α is "Out-of-bounds" giving a 2-bit result of 0b01, shown in step 56. If the sign is equal to a bit value of zero, it is negative and α is less than −X, shown in step 82 wherein once again α is "out-of-bounds" giving a 2-bit result of 0b10, shown in step 52.

Referring once again to FIGS. 4A and 5, if a is not greater than X, the process proceeds to step 68 to compare if the exponent 112 of α is equal to the exponent 118 of X. by using once again the exponent comparator 138 in circuit 160. If α's exponent is equal to X's exponent the process moves to steps 70, 72 and compares the fraction 114 of α to the fraction 120 of X utilizing the fraction comparator 140 in circuit 160. If the fraction 114 of α is greater than the fraction 120 of X the process proceeds to step 74 and continues as described above. However, if in step 72, the fraction 114 of α is not greater than the fraction 120 of X or if in step 68 the exponent 112 of α is not equal to the exponent 118 of X, the process moves to step 78 with the result being that the magnitude of α is less than or equal to the magnitude of X. Here, a 2-bit result of 0b00 is produced with a being "in-bounds" shown in step 58.

Referring now to FIGS. 4B and 5, the high-level logic flow diagram and associated circuit is depicted for determining if a special cases is present when using the bounds comparator function of the present invention. The first two steps, 88 and 90, check the exponent 112 of α to see if its bit representation is all "1's" and if its fraction component 114 is all "zero's". Referring to FIG. 5, the exponent 112 portion is inputted into "all ones" detect logic (i.e. AND gate) 122 of circuit 160 and the fraction 114 portion is inputted into "all zeros" detect logic (i.e. NOR gate) 122 of circuit 160 whose outputs are then inputted into ""AND"" gate 130 and inputted into ""AND"" gate 132 with the output of 124 inverted. If the exponent of α is all "one's" and the fraction of α is not all "zero's, the process proceeds to step 95 wherein α is an IEEE NaN (not a number) giving a 2-bit result of 0b11, shown in step 54. If the exponent of α is all "one's" and the fraction of α is all "zero's, the process proceeds to step 94 and continues to step 96 wherein α is an "infinity". Also, if in step 88, the exponent of α is not all "one's" the process proceeds to step 96.

Referring once again to FIGS. 4B and 5, the next two steps, 96 and 98, check the exponent 118 of X to see if its bit representation is all "1's" and if its fraction component 120 is all "zero's". Referring to FIG. 5, the exponent 118 portion is inputted into "all ones" detect logic (i.e. AND gate) 126 of circuit 160 and the fraction 120 portion is inputted into "all zeroes" detect logic (i.e. NOR gate) 128 of circuit 160 whose outputs are then inputted into "AND" gate 134 and inputted into "AND" gate 136 with the output of 128 inverted. If the exponent of X is all "one's" and the fraction of X is not all "zero's, the process proceeds to step 100 wherein X is an IEEE NaN (not a number) giving a 2-bit result of 0b11, shown in step 54. If the exponent of X is all "one's" and the fraction of X is all "zero's, the process proceeds to step 104 wherein X is an "infinity". Also, if in step 96, the exponent of X is not all "one's" the process proceeds to steps 102 wherein α and X are normal operands, hence no special case exists and the process proceeds to step 62 in accordance with the high-level logic flow diagram shown by FIG. 4A. This part of the process uses the "and" gate 143 and two "or" gates, 146 and 148, of the circuit 160 shown in FIG. 5.

As shown in step 106, a and X are checked to see if both are "infinities". If both α and X are "infinities", an "invalid operation" has occurred giving a 2-bit result of 0b11, shown in steps 108 and 52. Once again this part of the process uses the "and" gate 143 and two "or" gates, 146 and 148, of the circuit 160 shown in FIG. 5. If however, both α and X are not "infinities", then an "In-bound" condition has occurred giving a 2-bit result of 0b00, as shown in steps 110 and 58. Turning to FIG. 6, a table illustrating the results 152 obtained using the gate level logic for the above-described inputs 150 is shown.

Figure 7:
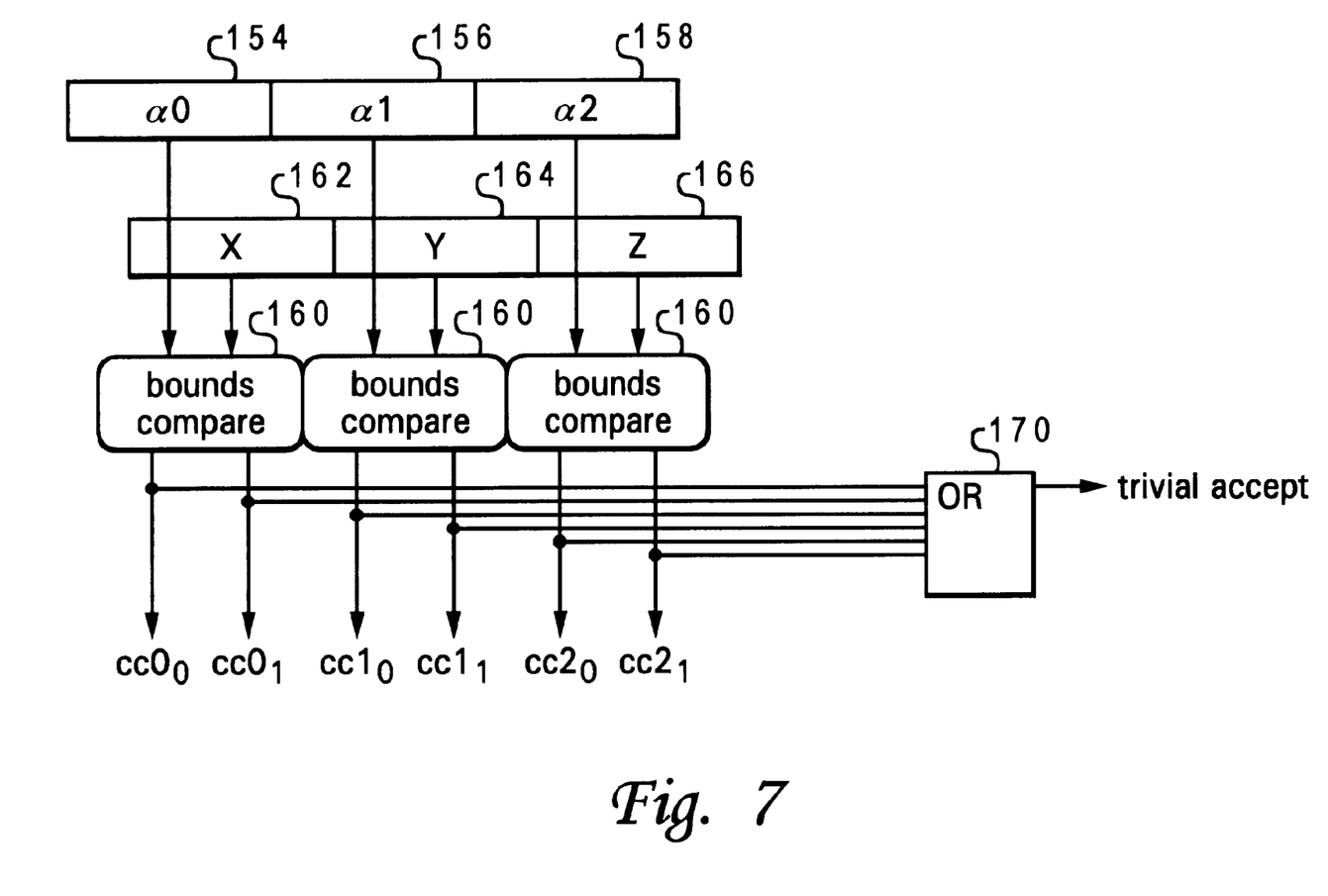
FIG. 7 is a high-level block diagram representing a three-element vector bounds compare operation in accordance with the present invention.

Referring now to FIG. 7, a high-level block diagram depicting a three-element vector bounds compare operation is illustrated. It is well known in the graphics art that bounds checking is used extensively in generating 3-D graphics. In accordance with a preferred embodiment of the present invention, the "bounds" comparator function is shown employed in 3 (three) dimensions. Numerous operations (special effects) can be performed on objects in 3-D graphics, such as lighting and shading. However, for these operations to be performed on an object it usually must reside either partially or completely in some pre-defined 3-dimensional space. By way of example, but not of limitation, the definition of 3-dimensional space uses an origin with coordinates, (0,0,0), and the defined space of a cube ranging in the x-dimension 162 from −X to +X, in the y-dimension 164 from −Y to +Y and in the z-dimension 166 from −Z to +Z, where X, Y, and Z are defined by each specific application.

Referring once again to FIG. 7, an object (i.e. a point, line, triangle, or polygon) is defined by one or more vertices, or coordinates, α1 154, α2 156 and α3 158. An object lies within the defined 3-D space if all of the vertices α1 154, α2 156 and α3 158 that define the object lie within the defined space, X 162, Y 164 and Z 166. Even if an object lies partially or totally outside of the defined 3-D space, an application user may be interested in how it is positioned relative to the defined 3-D space. A vertex lies within the defined space if the following conditions are met:

$$-X \leq \alpha 1 \leq +X$$

$$-Y \leq \alpha 2 \leq +Y$$

$$-Z \leq \alpha 3 \leq +Z$$

Using three bounds comparator functions 160 of the present invention, it may be determined quickly with minimal software coding if a vertex is located in the defined 3-D space. In another embodiment of the invention, the compare bounds operation could be packaged to use three operations in a single vector compare bounds operation and associated circuit, where one input vector would contain x, y, and z of the vertex and the other input vector would contain X, Y, and Z. Additionally, a vector bounds comparison could involve any arbitrary number of individual bounds comparison operations.

Therefore, employing the bounds comparison, as mentioned earlier, is, in 3-D graphics, to determine if an object (i.e., all of the vertices that define the object, or all of the components of all of the vertices that define the object) are contained in the defined 3-D space, also known as trivial acceptance testing. With the vector bounds comparison function illustrated in FIG. 7, an entire vertex could be processed in parallel, and if any output is a one, then the vertex is not located in the defined space. By ORing 170 the outputs of the bounds comparison together, then complementing that result a single bit indicator is provided to identify that the vertex is contained within the defined space.

While the invention has been particularly shown and described with reference to a preferred embodiment, it will be understood by those skilled in the art that various changes in form and detail may be made therein without departing from the spirit and scope of the invention.

What is claimed is:

1. A method for a floating-point bounds comparison function which characterizes the location of a point with respect to a bounds region defined on each side by a number X within a data processing system, said method comprising the steps of:
   determining if an exponent component of a number X is greater than an exponent of a point;
   responsive to determining that said exponent component of said number X is greater than said exponent of said point, indicating a result that said point is "In bounds";
   responsive to determining that said exponent component of said number X is not greater than said exponent of said point; determining that said exponent component of said number X is equal to said exponent of said point;
   responsive to determining that said exponent component of said number X is not equal to said exponent of said point, indicating a result that said point is "Out of bounds";
   responsive to determining that said exponent component of said number X is equal to said exponent of said point; determining that a fraction component of said number X is greater than or equal to a fraction component of said point;
   responsive to determining that said fraction component of said number X is greater than or equal to said fraction of said point, indicating a result that said point is "In bounds";
   responsive to determining that said fraction component of said number X is not greater than or equal to said fraction of said point, indicating a result that said point is "Out of bounds";
   responsive to determining that said fraction component of said number is not greater than said fraction of said point, determining that a fraction component of said number is equal to a fraction component of said point;
   responsive to determining that said fraction component of said number is equal to said fraction of said point, indicating a result that said point is "In bounds"; and
   responsive to determining that said fraction component of said number is not greater than said fraction of said point and that said fraction component of said number is not equal to said fraction of said point, indicating a result that said point is "Out of bounds".

2. A method for a floating-point bounds comparison function according to claim 1, further including the step of:
   expressing both said fraction component and said exponent component of said point and said number X as a binary digital output as zeros and ones.

3. A method for a floating-point bounds comparison function according to claim 2, further including the step of:
   determining if said binary digital output of said fraction component of said point is equal to all zeros when said binary digital output of said exponent component of said point is equal to all ones;
   responsive to determining that said binary digital output of said fraction component of said point is equal to all zeros when said exponent component of said point is equal to all ones, indicating a result that said point is an "infinity";
   responsive to determining that said binary digital output of said fraction component of said point is not equal to all zeros when said exponent component of said point is equal to all ones, indicating a result that said point is "Not a Number".

4. A method for a floating-point bounds comparison function according to claim 3, further including the step of:
   determining if said binary digital output of said exponent component of said number X is equal to all ones when said binary digital output of said exponent component of said point is not equal to all ones;
   responsive to determining that said binary digital output of said exponent component of said number is not equal to all ones, treating said point and said number X as normal operands;
   responsive to determining that said binary digital output of said exponent component of said number X is equal to all ones, determining if said binary digital output of said fraction component of said number is equal to all zeros;
   responsive to determining that said binary digital output of said fraction component of said number X is equal to all zeros, indicating a result that said number X is an "infinity"; and
   responsive to determining that said binary digital output of said fraction component of said number X is not equal to all zeros, indicating a result that said number X is "Not a Number".

5. A method for a floating-point bounds comparison function according to claim 4, further including the step of:
   determining if said binary digital output of both said point and said number X are infinities, or said binary digital output of said point is a "Not a Number", or said binary digital output of said number X is a "Not a Number";
   responsive to said binary digital output of both said point and said number X are infinities or said point "Not a Number" or said number X is a "Not a Number", indicating a result of an "invalid operation"; and
   responsive to said binary digital output of both said point and said number X are not infinities and said point is not a "Not a Number" and said number X is not a "Not a Number", indicating a result is "In bounds" or "Out of bounds".

6. A method for a floating-point bounds comparison function according to claim 2, further including the step of:
   expressing said point as "in bounds" with a two bit digital representation "0b00".

7. A method for a floating-point bounds comparison function according to claim 2, further including the step of:
   expressing said point as "Out of bounds" when the sign of said point is expressed as a digital bit having a value of one representing a negative value with a two bit digital representation "0b10".

8. A method for a floating-point bounds comparison function according to claim 2, further including the step of:
   expressing said point as "Out of bounds" when the sign of said point is expressed as a digital bit having a value of zero representing a positive value with a two bit digital representation "0b01".

9. A method for a floating-point bounds comparison function according to claim 5, further including the step of:
   expressing said point or said number X as "Not a Number" with a two bit digital representation "0b11".

10. A method for a floating-point bounds comparison function according to claim 5, further including the step of:
    expressing said point and said number X both as "infinities" with a two bit digital representation "0b11".

11. A circuit for a floating-point bounds comparison function which characterizes the location of a point with respect to a bounds region defined on each side by a number X used within a data processing system, said circuit comprising:

means for determining if an exponent component of a number X is greater than an exponent of a point;

means for indicating a result that said point is "In bounds" when said exponent component of said number X is greater than said exponent of said point;

means for determining that said exponent component of said number X is equal to said exponent of said point when said exponent component of said number X is not greater than said exponent of said point;

means for indicating a result that said point is "Out of bounds" when said exponent component of said number X is not equal to said exponent of said point;

means for determining that a fraction component of said number X is greater than or equal to a fraction component of said point when said exponent component of said number X is equal to said exponent of said point;

means for indicating a result that said point is "In bounds" when said fraction component of said number X is greater than or equal to said fraction of said point; and means for indicating a result that said point is "Out of bounds" when said fraction component of said number X is not greater than or equal to said fraction of said point.

12. A circuit for a floating-point bounds comparison function according to claim 11, further comprising:

means for expressing both said fraction component and said exponent component of said point and said number X as a binary digital output of zeros and ones.

13. A circuit for a floating-point bounds comparison function according to claim 12, wherein means for determining if said exponent component of said number X is greater than or equal to said exponent of said point, further comprising:

inputting said exponent component of said point and said number X through a comparator.

14. A circuit for a floating-point bounds comparison function according to claim 13, wherein means for indicating a result that said point is "In bounds", comprising:

further inputting said exponent component of said point and said number X through an "and" and then an "or" gate, wherein means for expressing said result is a two bit digital representation "0b00".

15. A circuit for a floating-point bounds comparison function according to claim 13, wherein means for indicating a result that said point is "Out of bounds", comprising:

inputting said exponent component of said point and said number X through an exponent comparator.

16. A circuit for a floating-point bounds comparison according to claim 15, wherein means for indicating a result that said point is "Out of bounds" when said exponent component of said number X is not equal to said exponent of said point, further comprising:

further inputting said exponent component of said point and said number X and a sign component of said point through and "and" and then an "or" gate, wherein means for expressing said result is a two bit digital representation of "0b01" if said sign component of said point has a value of a zero and "0b10" if said sign component of said point has a value of a one.

17. A circuit for a floating-point bounds comparison according to claim 16, wherein means for determining that a fraction component of said number X is greater than or equal to a fraction component of said point when said exponent component of said number X is equal to said exponent of said point, further comprising:

inputting said exponent component of said point and said number X through an exponent comparator and inputting said fraction component of said point and said number X through a fraction comparator.

18. A circuit for a floating-point bounds comparison according to claim 17, wherein means for indicating a result that said point is "In bounds" when said fraction component of said number X is greater than or equal to said fraction component of said point, further comprising:

further inputting said exponent component and said fraction component of said point and said number X through an "and" and then an "or" gate, wherein means for expressing said result is a two bit digital representation of "0b00".

19. A circuit for a floating-point bounds comparison according to claim 18, wherein means for indicating a result that said point is "Out of bounds" when said fraction component of said number X is not greater than or equal to said fraction component of said point, further comprising:

further inputting said exponent component and said fraction component of said point and said number X and a sign component of said point through an "and" and then an "or" gate, wherein means for expressing said result is a two bit digital representation of "0b01" if said sign component of said point has a value of a zero and "0b10" if said sign component of said point has a value of a one.

20. A method for a floating-point bounds comparison function which characterizes the location of a point with respect to a bounds region defined on each side by a number X within a data processing system, said method comprising the steps of:

determining if an exponent component of a number X is greater than an exponent of a point expressing both said fraction component and said exponent component of said point and said number X as a binary digital output as zeros and ones;

responsive to determining that said exponent component of said number X is greater than said exponent of said point, indicating a result that said point is "In bounds";

responsive to determining that said exponent component of said number X is not greater than said exponent of said point; determining that said exponent component of said number X is equal to said exponent of said point;

responsive to determining that said exponent component of said number X is not equal to said exponent of said point, indicating a result that said point is "Out of bounds";

responsive to determining that said exponent component of said number X is equal to said exponent of said point; determining that a fraction component of said number X is greater than or equal to a fraction component of said point;

responsive to determining that said fraction component of said number X is greater than or equal to said fraction of said point, indicating a result that said point is "In bounds";

responsive to determining that said fraction component of said number X is not greater than or equal to said fraction of said point, indicating a result that said point is "Out of bounds";

responsive to determining that said fraction component of said number is not greater than said fraction of said point, determining that a fraction component of said number is equal to a fraction component of said point;

responsive to determining that said fraction component of said number is equal to said fraction of said point, indicating a result that said point is "In bounds";

responsive to determining that said fraction component of said number is not greater than said fraction of said point and that said fraction component of said number is not equal to said fraction of said point, indicating a result that said point is "Out of bounds";

determining if said binary digital output of said fraction component of said point is equal to all zeros when said binary digital output of said exponent component of said point is equal to all ones;

responsive to determining that said binary digital output of said fraction component of said point is equal to all zeros when said exponent component of said point is equal to all ones, indicating a result that said point is an "infinity";

responsive to determining that said binary digital output of said fraction component of said point is not equal to all zeros when said exponent component of said point is equal to all ones, indicating a result that said point is "Not a Number";

determining if said binary digital output of said exponent component of said number X is equal to all ones when said binary digital output of said exponent component of said point is not equal to all ones;

responsive to determining that said binary digital output of said exponent component of said number is not equal to all ones, treating said point and said number X as normal operands;

responsive to determining that said binary digital output of said exponent component of said number X is equal to all ones, determining if said binary digital output of said fraction component of said number is equal to all zeros;

responsive to determining that said binary digital output of said fraction component of said number X is equal to all zeros, indicating a result that said number X is an "infinity";

responsive to determining that said binary digital output of said fraction component of said number X is not equal to all zeros, indicating a result that said number X is "Not a Number";

determining if said binary digital output of both said point and said number X are infinities, or said binary digital output of said point is a "Not a Number", or said binary digital output of said number X is a "Not a Number";

responsive to said binary digital output of both said point and said number X are infinities or said point is a "Not a Number" or said number X is a "Not a Number", indicating a result of an "invalid operation"; and responsive to said binary digital output of both said point and said number X are not infinities and said point is not a "Not a Number" and said number X is not a "Not a Number", indicating a result is "In bounds" or "Out of bounds".

* * * * *

UNITED STATES PATENT AND TRADEMARK OFFICE
CERTIFICATE OF CORRECTION

| | | |
|---|---|---|
| PATENT NO. | : 6,298,365 B1 | Page 1 of 1 |
| DATED | : October 2, 2001 | |
| INVENTOR(S) | : Dubey et al. | |

It is certified that error appears in the above-identified patent and that said Letters Patent is hereby corrected as shown below:

<u>Title page,</u>
Item [73], add -- Motorola, Inc., Schaumburg, Illinois -- and -- Apple Computer, Cupertino, California --;

<u>Column 5,</u>
Line 3, please delete the word "a" and add -- $\alpha$ --;
Line 61, please delete the word "a" and add -- $\alpha$ --.

Signed and Sealed this

Twelfth Day of November, 2002

Attest:

JAMES E. ROGAN
*Attesting Officer*       *Director of the United States Patent and Trademark Office*